(12) United States Patent
Tiemann

(10) Patent No.: US 6,457,594 B1
(45) Date of Patent: Oct. 1, 2002

(54) EXPANDABLE COOKING RACK FOR FOODSTUFFS

(75) Inventor: Frank Tiemann, Braham, MN (US)

(73) Assignee: T & L Nifty Products, Inc., Braham, MN (US)

( * ) Notice: Subject to any disclaimer, the term of this patent is extended or adjusted under 35 U.S.C. 154(b) by 0 days.

(21) Appl. No.: 09/928,083

(22) Filed: Aug. 13, 2001

(51) Int. Cl.[7] .................................................. A47F 5/14
(52) U.S. Cl. .................................................. 211/181.1
(58) Field of Search .............................. 211/181.1, 175, 211/133.5, 85.5, 133.2, 85.31, 88.02, 90.03, 126.1, 126.9

(56) References Cited

U.S. PATENT DOCUMENTS

| | | | |
|---|---|---|---|
| 1,006,328 A | * | 10/1911 | Widenhofer |
| 3,063,360 A | * | 11/1962 | Fitch et al. |
| 3,998,170 A | * | 12/1976 | Gordon |
| 5,103,799 A | | 4/1992 | Atanasio ........................ 126/9 |
| 5,421,246 A | | 6/1995 | Tippmann et al. ............ 99/448 |
| 5,558,237 A | | 9/1996 | Ancona ....................... 211/133 |
| 5,560,286 A | | 10/1996 | Fabrikant ..................... 99/426 |
| 5,638,742 A | | 6/1997 | Kassaseya ................... 99/426 |
| 6,119,588 A | * | 9/2000 | Tiemann |
| 6,164,194 A | * | 12/2000 | Westmoreland |
| 6,279,467 B1 | * | 8/2001 | Tiemann |

* cited by examiner

*Primary Examiner*—Alvin Chin-Shue
*Assistant Examiner*—Saran Purol

(57) ABSTRACT

An expandable cooking rack for foodstuffs providing a two section longitudinally extending rack having a plurality of spaced lateral rods or bars encompassed with a surrounding, formed, rim having shiftable handle members on the longitudinal ends of the surrounding rim, Foot or surface elevating legs are provided on selected of said lateral rods to elevate the rack above a support surface. The surrounding rim is provided with telescoping portions to allow and limit the extension of the sections.

1 Claim, 4 Drawing Sheets

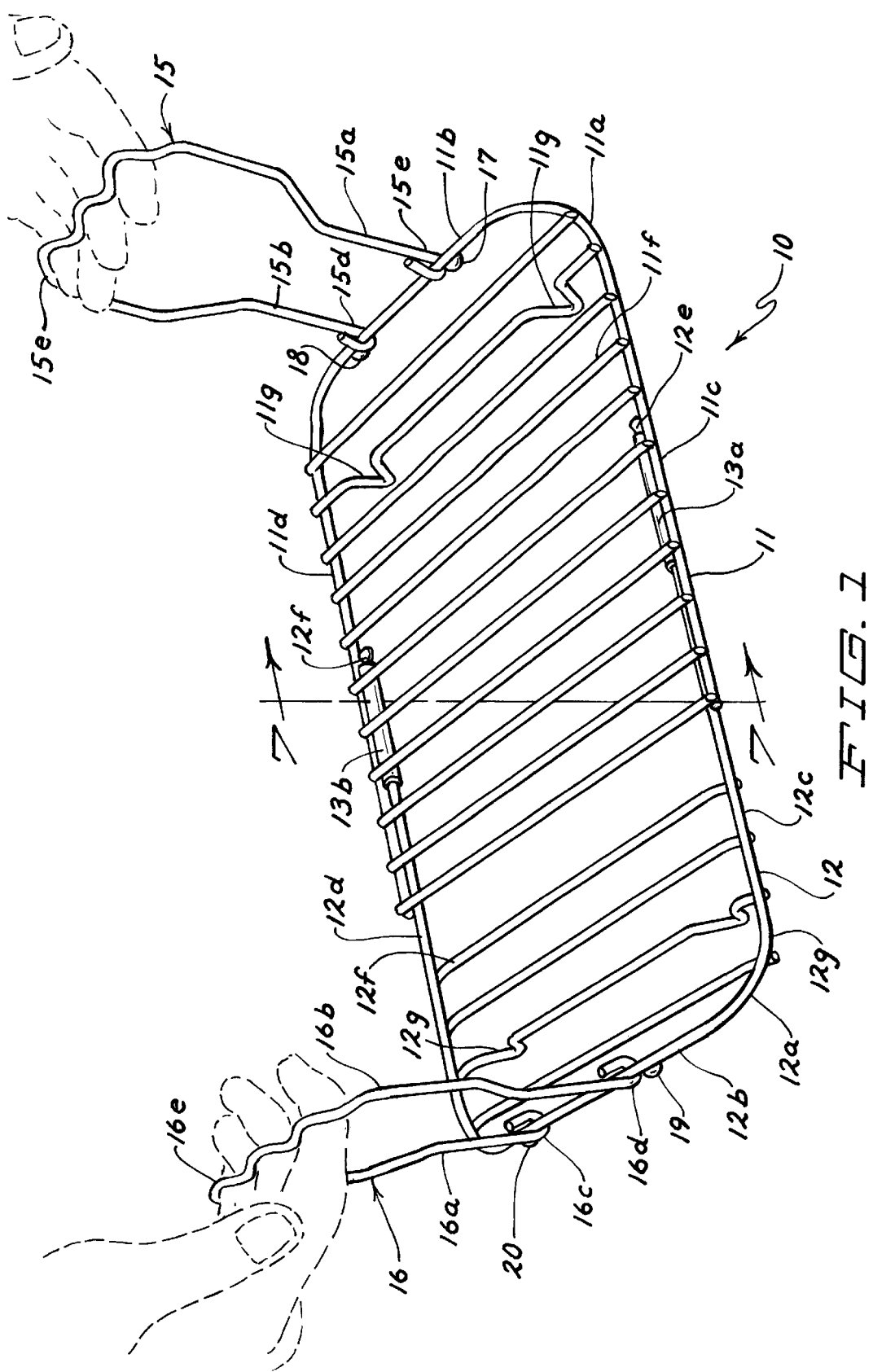

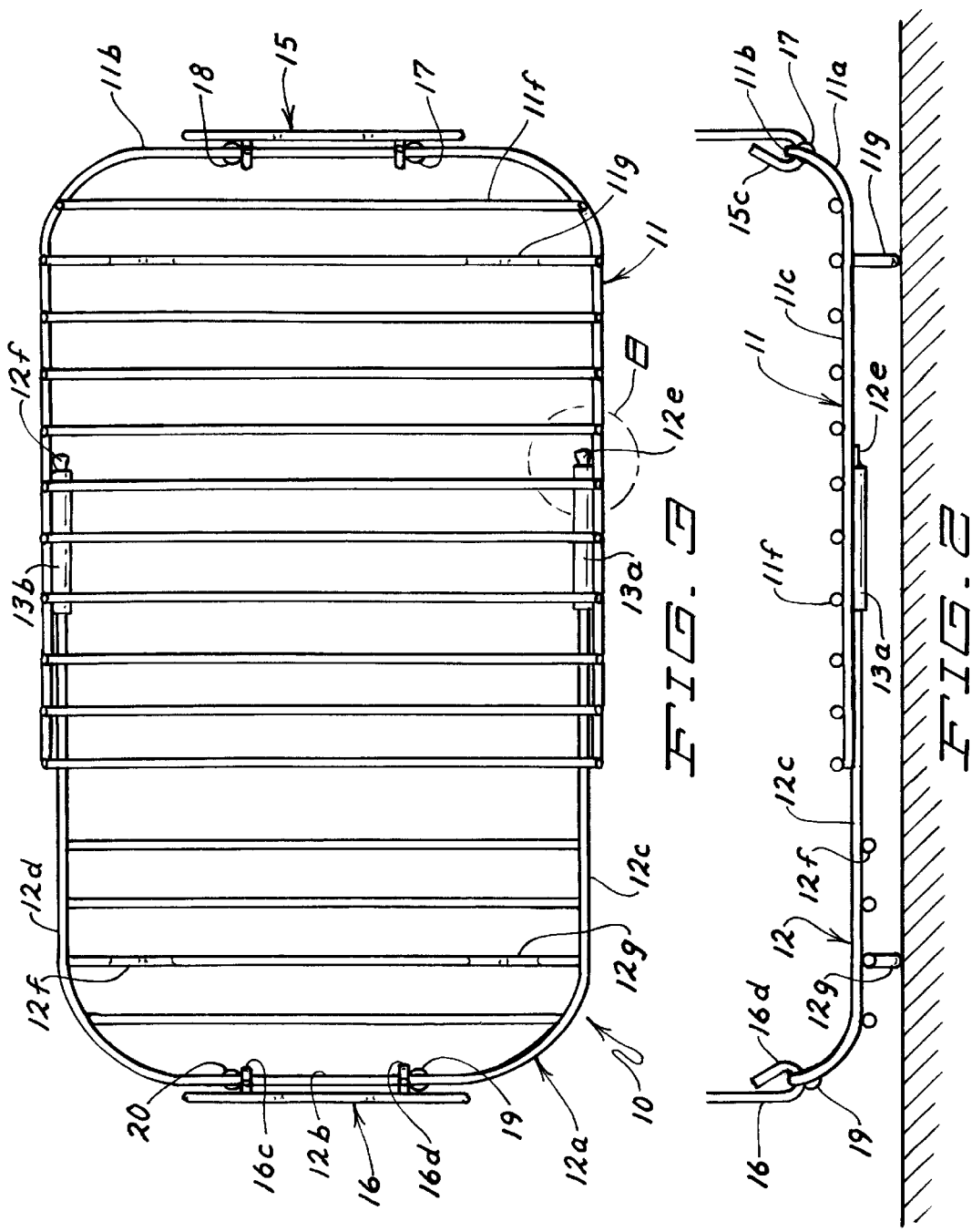

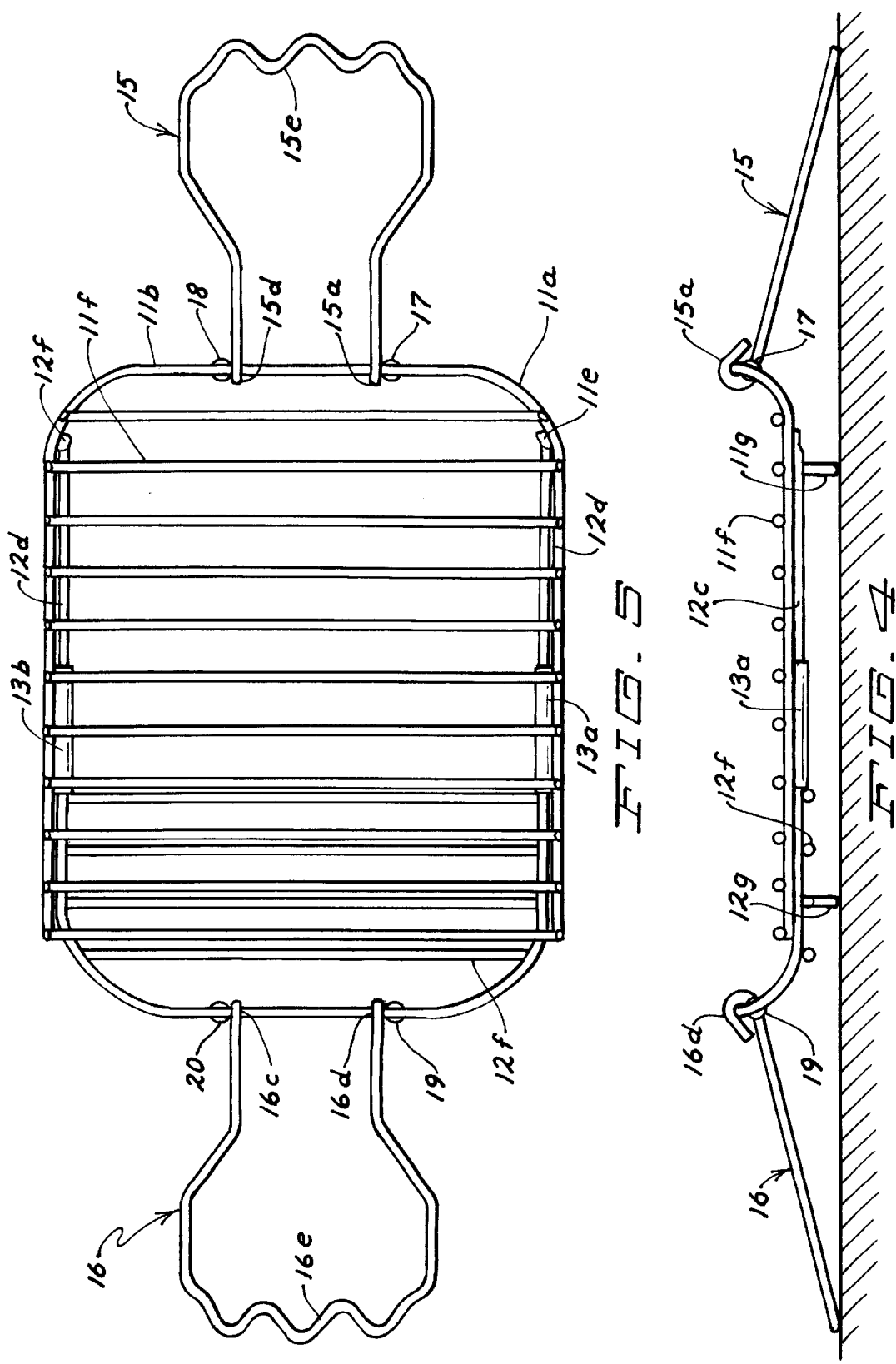

EXPANDABLE COOKING RACK FOR FOODSTUFFS

RELATED APPLICATIONS

Applicant has not filed any and is not aware of any applications by others which should be considered during the prosecution of this application. Applicant has filed an application for Patent upon which the Final Fee has been paid, as of Jun. 11, 2001, Ser. No. 09/795,995, Filed Nov. 20, 2000, entitled Expandable Cooling Rack for Foodstuffs which, though expandable, utilizes a three section system and does not includes the concepts of the invention disclosed herein.

SPONSORSHIP

This invention was made under the sole efforts of the applicant and has not been made under any Federal or Independent Sponsorhip.

FIELD OF THE INVENTION

A cooking rack for foodstuffs having a two section construction wherein the sections are telescopingly arranged to permit limited, one directional expansion and more specifically to an expandable cooking rack having lateral foodstuff support bars with support legs on selected of such bars and provided with handle means for lifting of the same.

SHORT SUMMARY OF THE INVENTION

An expandable, in one direction, cooking rack for various foodstuffs including an outer frame, a plurality of lateral foodstuff support bars extending across the frame with handle means on the respective ends of the frame. Support legs are provided on selected of the lateral bars and the handles of the unit are secured relative to the frame which permits rotation of the same while preventing sideways motion upon the frame.

BACKGROUND AND OBJECTS OF THE INVENTION

Very often, in the cooking of foodstuffs, which may be of various sizes, it is often desirable to have a rack for supporting the same which is adjustable to the size of the foodstuff article.

Applicant has found that the majority of cooking racks do not provide for any adjustment of the dimensions thereof and, as such, are relatively useless. Applicant provides herein a cooking rack which is expandable in a longitudinal direction to accommodate foodstuffs of various size and which provides sufficient support for the article while in the expanded dimension.

Further, after cooking, it is desirable to provide supports which will elevate the cooked or even prior to cooking, the uncooked meat, above a preparation surface. For this reason, applicant provides leg supports for the rack herein.

In addition to the above, the essential aspect of carrying and handling the rack supported foodstuff is disregarded. With the applicant's device, handles which are rotatably mounted to an exterior frame are provided which may be folded against the rack when the unit is stored.

It is therefore an object of the applicant's invention to provide a cooking rack for foodstuffs which is, at lest, longitudinally expandable to accommodate foodstuffs of various sizes.

It is a further object of the applicant's invention to provide a cooking rack for foodstuffs having supporting legs to elevate the foodstuff above a support surface when the same is placed on the rack.

It is yet a further object of the applicant's invention to provide a rack for cooking of foodstuffs which includes handle means which are foldable against the rack for storage.

These and other objects and advantages of the applicant's invention will more fully appear from a consideration of the accompanying drawings and disclosure.

SHORT DESCRIPTION OF THE DRAWINGS

FIG. 1 is a top perspective of an expandable cooking rack embodying the concepts of the applicant's inventing showing the same in expanded position and illustrating a user's hand, in dotted lines in use position within the handles of the unit;

FIG. 2 is a side elevation of the cooking rack, again showing the same in expanded position;

FIG. 3 is a plan view of FIG. 2;

FIG. 4 is a side elevation of the cooking rack in its inwardly telescoped position with the handles directed outwardly;

FIG. 5 is a plan view taken from FIG. 4;

DESCRIPTION OF A PREFERRED FORM OF THE INVENTION

Figure 8:
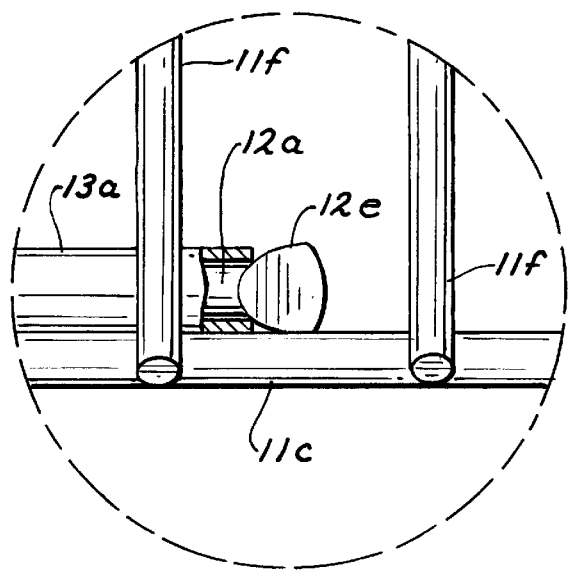
Figure 7:
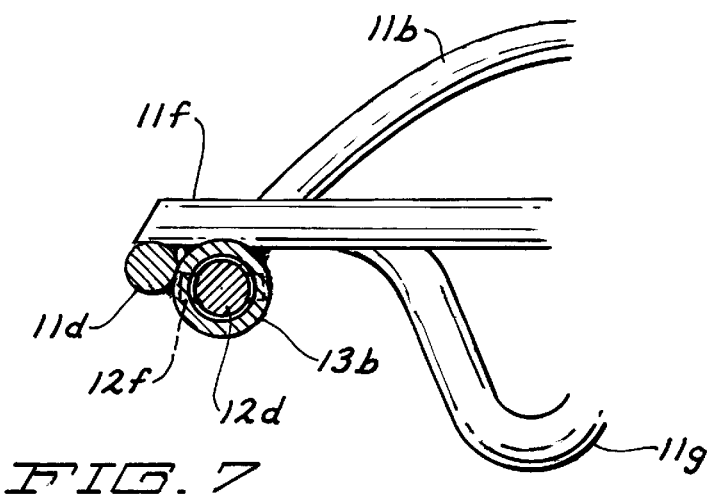
FIG. 7 is cross section of the telescoping joinder of the sections taken substantially along Line 7—7 of FIG. 1; and, FIG. 8 is an enlarged view of the encircled portion designated by the numeral 8 in FIG. 3.
Figure 6:
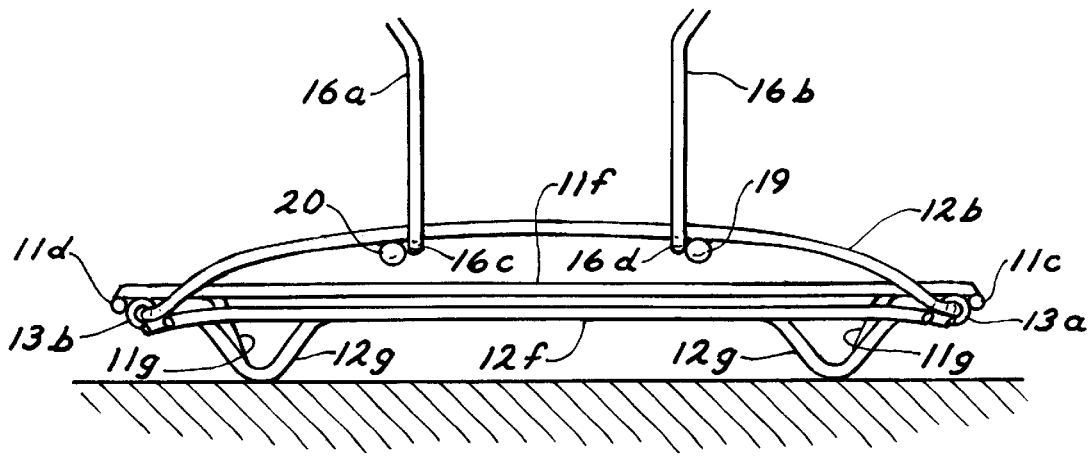
FIG. 6 is an end view of the rack.

In accordance with the accompanying drawings, the expandable cooking rack embodying the concepts of the applicant's invention is generally designated 10 and includes a pair of telescoping rack sections, the first designated as outer rack 11, the other designated as inner rack 12. Each of the racks 11, 12 includes a generally U-shaped frame member 11a, 12a to provide an end or joinder portion 11b, 12b and legs 11c, 11d, 12c, 12d. The legs 11c, 11d of rack section 11 are spaced apart slightly more than legs 12c, 12d of rack 12 to allow rack 12 to slide therebetween and telescoping connectors 13a, 13b are provided on legs 12c, 12d of rack 12 to receive the ends of legs 11c, 11d of rack 11. The ends 11e 11f of these legs 11c, 11d are enlarged to permit telescoping thereof into the connectors 13a, 13b and prevent over extension of the same and thus prevent separation of the sections 11, 12. As shown in FIG. 6, the joinder portions of each rack are elevated above the remainder of the rack structure.

A plurality of laterally extending, spaced, foodstuff support bars 11f, 12f are provided on each of the rack sections 11, 12 and at least one of such bars 11f, 12f is provided with a downwardly formed portion 11g, 12g to serve as a support leg to normally elevate the entire rack system above a support surface.

A handle member 15, 16 is provided on the respective ends 11a, 12a of each rack section 11, 12 and each such handle provides a formed U-shaped portion which has downwardly arranged arms 15a, 15b, 16a, 16b having rotative connection means 15c, 15d, 16c, 16d at the ends thereof to rotatively connect the same to the end elements 11a, 12a of the rack sections 11, 12. The U-shaped portion of each handle 15, 16 may be formed to have finger placement areas 15e, 16e at what may be the joindure section of the arms 15a, 15b, 16a, 16b.

These handles 15, 16 then may be shifted with respect to the racks 11, 12 for folding thereagainst for storage purposes and lifted therefrom for a use or transport position.

Handles 15, 16 are also prevented from sliding laterally on the U-frame portion 11*a*, 12*a* by outwardly disposed stops, 17, 18, 19, 20 on this frame portion. Although illustrated as being downwardly dependent, these stops 17, 18, 19, 20 may be directed outwardly in any desired direction as there only purpose is to prevent the handles 15, 16 from sliding sidewardly upon the rack sections 11, 12.

With the applicant's unit, a limited movement of the racks 11, 12 is obtained such that the longitudinal dimension thereof may be increased to accommodate foodstuffs of various dimension. The enlargement of the total rack 10 will not cause collapse of the rack as the telescoping connection 13*a*, 13*b* is of a length to insure rack section alignment.

It should be obvious that applicant has provided a rack for foodstuffs that is size accommodating while maintaining support stability.

What is claimed is:

1. An expandable rack for foodstuffs, expanding in at least a single direction, including:

a. a pair of telescoping racks, each having a generally U-shaped frame including a joinder member and extending arms with the arms of a first such rack being receivable between said extending arms of the second such rack;

b. means on said arms of one of said racks to receive and permit telescoping of the arms of said other rack whereby the longitudinal dimension of the rack may be increased and decreased;

c. means on the ends of said arms of said other rack limiting the longitudinal extension of said racks;

d. a plurality of laterally extending, spaced support members arranged on each of said racks for the support of foodstuffs thereon;

e. said U-shaped frames including rotatably mounted handle means on each of said joinder members;

f. means on said joinder member of each of said racks to prevent lateral movement of said handle means; and, g. finger locating areas provided on said handle means.

\* \* \* \* \*